June 27, 1967 S. LANDON 3,327,507
APPARATUS FOR WASHING, CLEANING OR PROCESSING
Filed Oct. 8, 1964 2 Sheets-Sheet 1

INVENTOR.
STEVEN LANDON
BY
James A. Eisenman
ATTORNEY.

June 27, 1967  S. LANDON  3,327,507
APPARATUS FOR WASHING, CLEANING OR PROCESSING
Filed Oct. 8, 1964  2 Sheets-Sheet 2
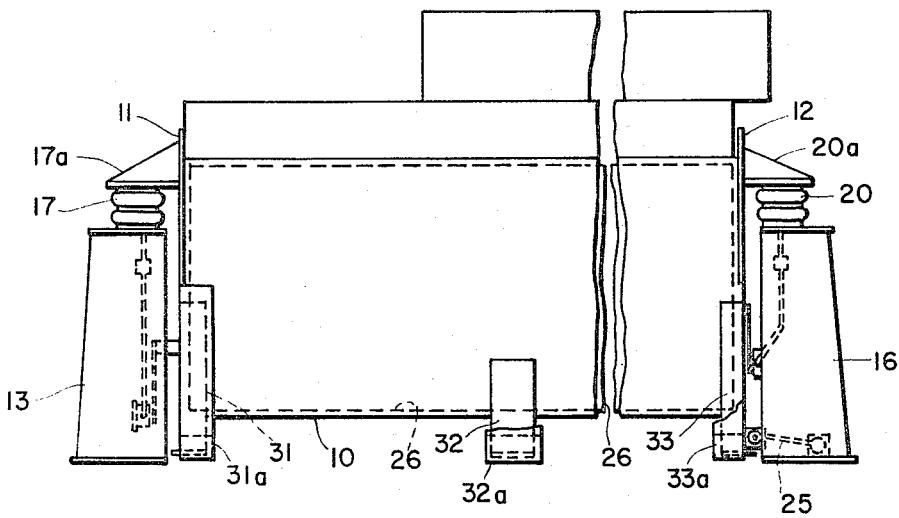
FIG. 3
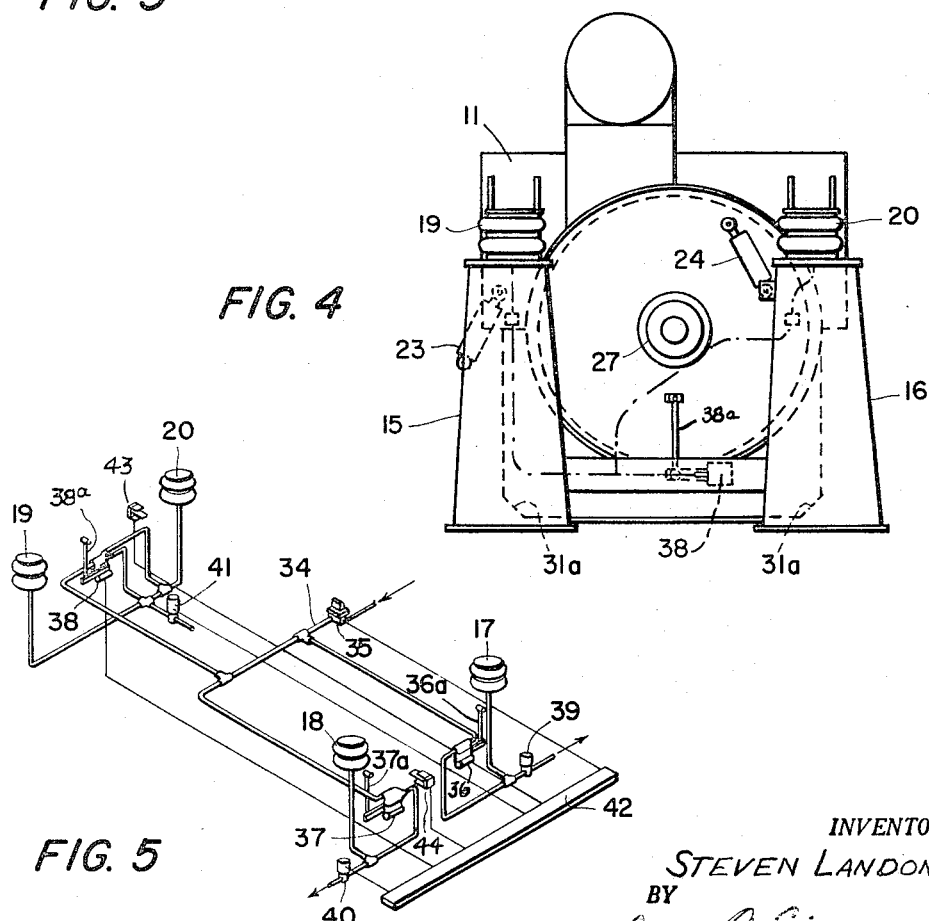
FIG. 4
FIG. 5
INVENTOR.
STEVEN LANDON
BY
ATTORNEY.

3,327,507
APPARATUS FOR WASHING, CLEANING
OR PROCESSING
Steven Landon, Bayside, N.Y., assignor to Washex Machinery Corporation, Plainview, N.Y., a corporation of New York
Filed Oct. 8, 1964, Ser. No. 402,383
8 Claims. (Cl. 68—24)

This invention relates to washing and extracting machinery and in particular, to industrial equipment for automatically performing such sequential operations as subjecting the load to liquid immersion with rotary tumbling action and extracting liquid from the load by centrifugal action. More generally, the invention relates to methods and apparatus for enabling the equipment to perform its divers functions under a wide range of conditions, such as varying size and kind of load, with minimized vibration for each stage in the operation.

Present-day equipment used in the washing and cleaning industry comprised of large drums or chambers which can be rotated at relatively slow speeds to tumble the load in liquid after which it can also be rotated at progressively higher speeds to distribute saturated loads for dynamic balance and thereafter to extract entrained liquid by imposing high centrifugal forces thereon. Such drums or chambers are typically suspended in bearings for rotation about a horizontal axis and the bearings or entire machines are base mounted through springs to isolate attendant vibration from the floor to protect both the building and the machine.

The vibration frequency and excursion, however vary over a wide range as a function of weight, weight distribution, and speed of rotation. During the washing or liquid cycle the speed is low and the mass of load plus liquid is high and largely free falling as a result of the tumbling action. At this stage the downward and lateral excursion or deflection of the chamber is large and conventional spring mounts must be stiff enough to resist it, even in cases where snubbers are used as a supplement. During the extracting cycle the liquid is drained and rotation or spinning action occurs at progressively higher speeds, first to distribute the load circumferentially for approximate dynamic balance in rotation and thereafter to extract the entrained liquid, first at lower and then at maximum speed. The induced vibration frequency goes up at a result of increased speed. At this stage the mounting springs should be soft to isolate the vibration from the floor. The problem of isolating these vibrations is further complicated in conventional machines due to uneven load distribution axially of the cylindrical drum, which can cause pitching and yawing. Still another problem is the natural resonant point of the overall system. Ideally, this frequency occurs during transient conditions where the speed of drum rotation is changing at a maximum rate to minimize the duration of this highly dynamic condition in which natural resonance and induced vibration are in phase. Good design practice dictates that it occur at a relatively low frequency and as far as possible from any steady state vibration frequency. For this purpose soft mounting and high total mass are desirable to reduce natural resonant frequency. As pointed out above, however, soft mounting is not ideal for the washing cycle and compromises become essential even though compromises in spring constants are necessarily less than optimum for all stages.

Accordingly, the present invention has for its object to overcome the several problems and disadvantages of conventional rotary equipment set forth above. More particularly, it is one object of the present invention to provide automatic washing and extracting equipment which automatically achieves optimum operating characteristics over a range of load conditions.

Another object of the invention is to provide commercial dry cleaning and laundry machinery which is capable of accommodating large or small loads and in which the mass distribution of the load axially of the cleaning unit need not be uniform.

In accordance with the present invention the main housing of a cleaning machine, such, for example, as a combination washing and extracting unit is floor mounted on pedestals through spring members such as pneumatic bellows. The members are preferably capable of controlled elongation and contraction so that the housing can be caused to rest directly upon the floor by means, for example, of supplementary legs, thereby hard mounting the machine for the high vertical and horizontal thrust which results from the tumbling load. After tumbling, the speed of rotation is raised to distribute or balance the load circumferentially about the cylindrical drum, after which heavy impact forces cease. Thereafter the system is caused to be supported on relatively soft spring means which, in the preferred arrangement of the invention, take the form of pneumatic bellows which are inflated to raise the system from its hard floor mount. The spinning chamber is accelerated toward its maximum extraction rate, passing successively through the natural resonant frequency and the low speed extraction stage. The spring constant is selected to afford efficient isolation at low extraction speed and the amount of air introduced into the bellows, under the control of limit switches and leveling valves, is sufficient to raise the housing to a position which prevents the supplemental legs from engaging the base under maximum excursion. As the speed of rotation increases to the maximum extraction speed the isolation efficiency increases.

In one preferred embodiment of the invention at least four vertically adjustable resilient supports are disposed at the corners of the housing in a four point suspension. Compensation for uneven load distribution axially is accomplished by varying the air pressures in the respective bellows to offset weight differences. For this purpose three sensing elements, referenced to the base or ground, are provided respectively at the two corners of one end of the housing and between the two corners at the other end, with the latter controlling the two bellows at that end simultaneously through a common valve. At the opposite end two sensing elements control the respective bellows independently. In operation, after the liquid cycle has been completed and the free liquid drained from the cylindrical drum, the housing is raised to a predetermined level, after which the sensors assume control to maintain the level. Thus the system is independent of the weight of the load and of its placement axially along the vat.

The above and other features and advantages of the present invention will be apparent in the following specification having reference to the accompanying drawing in which, FIGURE 1 is a top view of an industrial type washing and extracting machine embodying the present invention;

FIGURE 3 is a view in side elevation of the machine of FIGURE 1;

FIGURE 4 is a view showing the opposite end of the machine illustrated in FIGURE 2; and FIGURE 5 is a schematic drawing of the suspension system of the machine.

Figure 1:
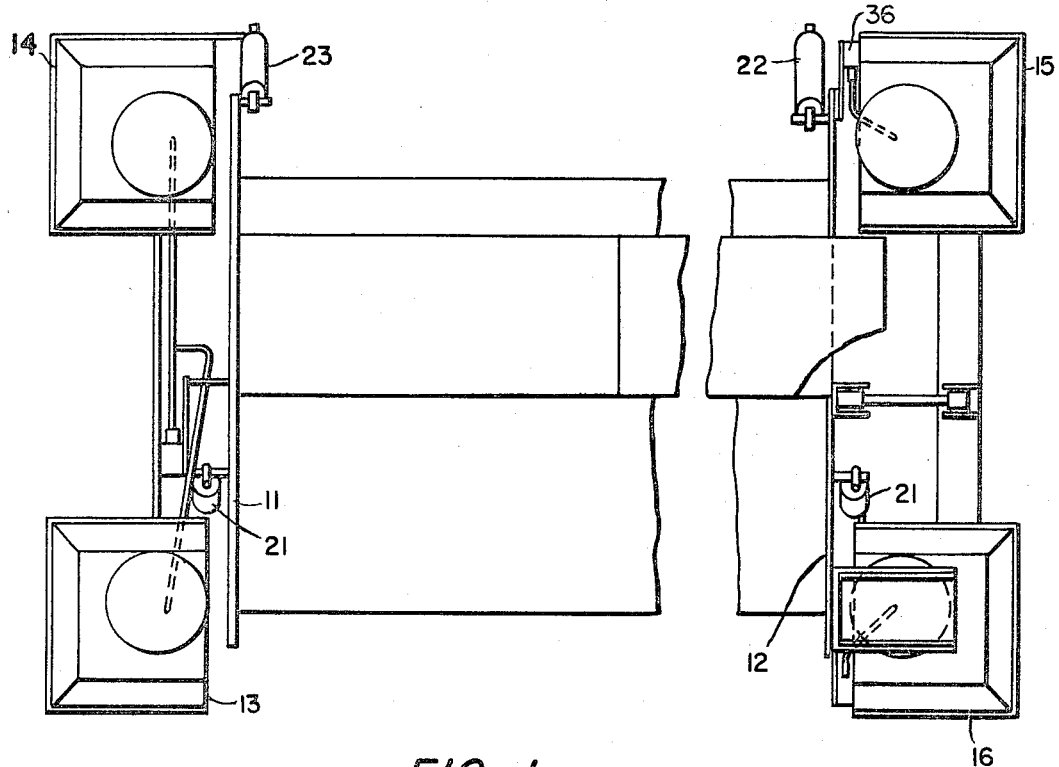
Figure 2:
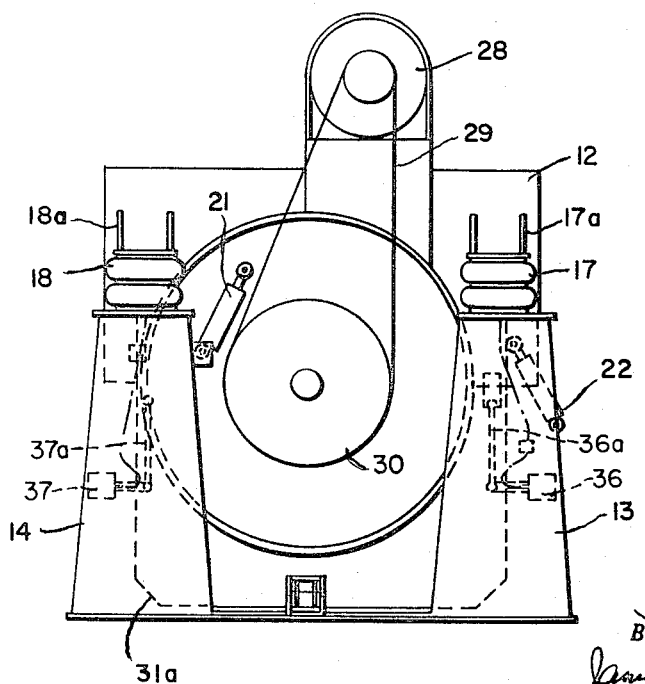
FIGURE 2 is an end view of the machine of FIGURE 1.

Referring to the drawings, the numeral 10 identifies the main housing or shell for an industrial dry cleaning or laundry washer and extraction combination, and takes the form of a rigid, generally cylindrical frame having transverse end plates 11 and 12. During part of each cycle of operation the housing 10 is supported through its end plates by means of four rectangularly arrayed pedestals or supports 13, 14, 15 and 16 surmounted, respectively, by vertically adjustable resilient means preferably taking the form of pneumatic bellows 17, 18, 19 and 20. The upper ends of the respective bellows 17–20 are coupled to the adjacent end plates by cantilever arms 17a, 18a, 19a and 20a. The resilient means or bellows are adapted to be elongated by means of pneumatic pressure through a control system presently to be described.

The housing 10 is stabilized within the pedestals by means of a series of damping linkages 21, 22, 23 and 24 coupled, respectively, to the pedestals to afford both horizontal and vertical damping components. The damping linkages can take the form of shock absorbers in which metered air or liquid governs the rate of travel of a piston within a cylinder. The housing 10 is stabilized against movement axially by means of a pivoted link 25 which affords limited radial travel but inhibits longitudinal travel in the direction of the axis of the cylindrical frame. Mounted within the frame for rotary motion on a horizontal axis is a cylindrical drum or chamber 26 supported in end bearings 27, one of which is shown in FIGURE 4. Suitable access openings forming no part of the present invention are provided in the housing 10 and the cylindrical chamber 26 through which the load or work is loaded and removed by the operator. It will be understood that the machine is also furnished with suitable plumbing including feeder lines, drain lines, valves and the like for accommodating cleaning liquids. The cylindrical chamber 26, which is perforated to pass liquids and furnished with suitable baffles to augment tumbling and axial spacing, is driven in rotation over a range of speeds by means of drive motors 28, coupled by multiple drive belts 29 to a multi-sheave pulley 30 coupled in turn to the axle of the rotary chamber 26. The motor 28 is energized through a timer or control station 42 (FIGURE 5) to spin the chamber 26 at low speeds for washing and tumbling action and at a slightly higher speed for effecting dynamic balance of the load after the free liquid has been drained. In accordance with well known principles this is accomplished by rotating the chamber 26 at a speed such that the centrifugal force generated by the spinning chamber equals or is slightly larger than the gravity force that causes the load to tumble. This rate of speed depends on the diameter of the drum. For a typical drum size now in use, a speed of 42 r.p.m. is used. In this fashion items among the load which are disposed inward, radially speaking, will find their way randomly to points nearer the edge of the chamber where the centrifugal forces are sufficient to hold them in place through an entire rotation. Thereafter, the chamber 26 is brought to a higher spinning speed, in the vicinity of 275 r.p.m. at which entrained liquid is driven from the load through the perforated wall of the chamber 26 to the drain in the housing. This is known as the low extraction speed after which, if desired, the speed is increased to a higher extraction speed which can be in the vicinity of 550 r.p.m. to complete the extraction cycle.

In accordance with the present invention the frame 10 is hard mounted during the tumbling or cleaning cycle. To this end, the frame has attached to its underside a series of supports 31, 32 and 33 adapted to rest in cradles 31a, 32a and 33a which are supported directly on the floor to absorb the low frequency impact pounding of the tumbling load and liquid mass which drops randomly from the top of the chamber 26 to the bottom as the chamber turns on its axis. The cradles are formed with inclined ends, as best seen in FIGURE 4, which receive correspondingly formed surfaces in the feet 31, 32 and 33 so that the entire housing is centered by camming action as it lowers onto the cradles.

Referring now to FIGURE 5, the resilient spring means or bellows 17–20 preferably include upper and lower mounting plates bridged by a flexible wall which is corrugated to afford extension over an operating range from approximately six to ten inches under normal operating conditions. The lower mounting plates of the respective resilient bellows are affixed to the pedestals or supports 13–16 and the upper plates to the respective cantilever arms 17a–20a of the frame 10. The source of pneumatic pressure (not shown) is connected through a conduit system 34 including a master control valve 35 to the several resilient bellows through openings in the bottom of each. The circuit to the respective bellows 17 and 18 includes series-connected leveling valves 36 and 37 and the circuit to the two bellows 19 and 20 includes a single or common leveling valve 38. Associated with each of the leveling valves are series-connected check valves embodied in the valve housing and forwardly directed to admit air to the corresponding bellows but to prevent back flow. The bellows 17 is connected to atmosphere through a solenoid-controlled valve 39 and the bellows 18 through a solenoid-controlled valve 40. The two bellows 19 and 20 are connected to atmosphere through a common solenoid-controlled exhaust valve 41. Each of the leveling valves 36, 37 and 38 is connected to the resiliently supported housing through articulated linkages 36a and 37a being connected to opposite sides of one end of the housing and the linkage 38a being connected to a point near the center of the housing at the other end.

The main control valve 35 is a two-way valve which is adapted when de-energized to isolate the system from the source of supply and when energized to connect the source of supply to the conduit system 34. The leveling valves 36, 37 and 38 are three-way valves arranged (1) to connect the pressure source to the bellows; (2) to isolate the inflated bellows from the source to maintain the air pressure therein and (3) to bleed air from the bellows to atmosphere, all as a function of the position of the actuating linkages. The exhaust valves 39, 40 and 41 are two-way valves adapted to open when energized to vent the bellows to atmosphere and to close when de-energized to hold the pressure in the bellows. The three valves 39, 40 and 41 as well as the master valve 35 include electrical connections to a programming timer 42, which can take the form of a conventional timer motor control switch assembly having a series of electrical contact opened and closed by cam elements, all well-known in the art, to apply selectively control voltages to the several solenoids.

The operation of the control system for the suspension is as follows: During the washing, cleaning or other liquid cycle in which the drum or chamber is partially filled with liquid and work to be processed, the three solenoids of the three valves 39, 40 and 41 are energized to open the valves to couple all of the resilient bellows to atmosphere so that the frame or housing 10 rests in the cradles 31a, 32a and 33a. At this time the master solenoid valve 35 is de-energized to isolate the bellows from the air pressure source and the horizontal control arms of the three leveling valves 36, 37 and 38 are disposed downward to couple the bellows to the master control valve 35. After the liquid cycle has been completed, the initial balancing cycle is begun, at which time the program timer 42 energizes the master control solenoid 35 to admit air under pressure into the conduit system 34 and through the respective leveling valves 36, 37 and 38 and check valves into the bellows 17–20. Meantime, the three valves 39, 40 and 41 are de-energized and therefore close. The air pressure inflates the bellows causing them to extend to lift the frame or housing 10 until the linkages 36a, 37a which connect, respectively, to the horizontal control arms and 38a of the leveling valves 36, 37 and 38 cause the horizontal control arms to reach their horizontal position, causing the valves to close to retain the captured air in the bellows.

In one preferred arrangement, the housing was lifted approximately 1¼ inches from its cradle. The housing or frame 10 will then float on the bellows free of the cradles while the drum spins at a relatively low rate of speed to distribute the load more or less uniformly about the drum circumferentially. The leveling valves meantime have automatically compensated for any uneven distribution of the load axially of the drum and they will continue to maintain the precise level under shifting weight conditions. Thus, if one end of the drum becomes lighter as it is driven at high rotary speed to extract liquid, the corresponding bellows at that end of the drum will be bled to atmosphere until the desired level is again attained. Similarly, if one end of the drum lowers under increasing weight conditions, the control linkage will actuate the appropriate valve or valves to admit additional air to the bellows to offset the weight increase and to effect leveling. The check valves will maintain the respective bellows pressures.

In the event of power failure the valves 39, 40 and 41 being de-energized, remain closed so that the drum will remain suspended resiliently for at least a sufficient period of time to allow the rotary motion to stop before the frame lowers onto its hard mount level.

If for any reason the suspended housing during the extracting or balancing cycle does not achieve the desired degree of balance for safe and efficient operation, the excursion of the resiliently supported system will increase, actuating limit switches 43 or 44 at opposite ends of the housing to shut down the source of power to the drive motors. The de-energized master control solenoid will vent to atmosphere but the check valves will prevent the escape of air from the bellows; the de-energized valves 39, 40 and 41 will continue closed, and the timer will be reset for another cycle.

It should be noted that any resiliently supported system has a period of natural resonance. Thus the entire housing 10 will have a natural period of resonance as a result of the four-point suspension of the resilient bellows. By virtue of the relatively soft mount afforded by the bellows, a relatively low resonant frequency is attained. It is preferred that this frequency be established at a value which differs from any of the fixed operating speeds. In one preferred arrangement the period of natural resonance was selected to occur between the load distributing or dynamic balancing speed which is in the vicinity of 42 r.p.m. and the low extraction speed which is in the vicinity of 275 r.p.m. because the machine accelerates and decelerates between these values at a relatively high rate and the natural resonant point is quickly passed.

While the invention has been described above having reference in particular to the accompanying drawings, it will be understood that it can take various other forms and arrangements without departing from the scope of the invention. For example, while pneumatic bellows represent the preferred means for both converting the suspension from a hard to a soft mount and for effecting the soft mount during a complete cycle of operation, other means can also be used. Springs can be used in place of the bellows and hard mounting can be effected either by lifting a rigid support to engage the housing or by gagging the springs to lower the housing onto a hard mount through conventional electromagnetic, hydraulic, or solenoid control. It will be understood, however, that the selection of the spring constants for a fixed spring system will, in the absence of a more sophisticated variable control, necessarily be selected to accommodate the maximum extraction load and will therefore be harder than is optimum for vibration isolation of lighter loads. The invention should not, therefore be regarded as limited except as defined by the following claims.

I claim:
1. Apparatus for treating work loads of varying sizes and distribution by means of treating liquid and thereafter extracting the treated liquid from the work, comprising a base, a work chamber mounted on the base for receiving a volume of work and treating liquid, means for establishing recurring relative motions between the chamber, the liquid and the work to continuously expose the work to the action of the liquid, means for spinning the chamber to extract liquid from the work by centrifugal action, control means to effect selectively the cleaning and extracting motions thereof, means responsive to said control means to resiliently support the chamber on the base during extraction to absorb induced vibrations and to couple the chamber directly to the base free of resilient support during the treating action, and a housing interposed between the work chamber and the base, said means to couple the chamber to the base including support elements, said support elements including portions on said housing and complementary base mounted portions coupled directly to the floor, said portions including inclined surfaces to center the housing by camming action in a predetermined position when it is lowered onto the base.

2. Apparatus as set forth in claim 1, said base comprising a plurality of at least three pedestals, said means to resiliently support the housing comprising resilient elements interposed between the housing and the pedestals.

3. Apparatus as set forth in claim 2, said resilient means comprising vertically expandable pneumatic bellows and said control means including a supply of air under pressure to actuate the bellows.

4. Apparatus for treating work loads of varying sizes and distribution by means of treating liquid and thereafter extracting the treating liquid from the work, comprising a base, a work chamber mounted on the base for receiving a volume of work and treating liquid, means for establishing recurring relative motions between the chamber, the liquid and the work to continuously expose the work to the action of the liquid, means for spinning the chamber to extract liquid from the work by centrifugal action, control means to effect selectively the cleaning and extracting motions thereof, means responsive to said control means to resiliently support the chamber on the base during extraction to absorb induced vibrations and to couple the chamber directly to the base free of resilient support during the treating action, and said control means including level sensing means referenced to said base for admitting air under selective pressure to said resilient support means to support the chamber resiliently in a predetermined attitude with respect to said base.

5. Apparatus as set forth in claim 4, wherein said resilient support means comprises vertically expandable pneumatic bellows and including check valve means between the pneumatic bellows and a supply of air under pressure for maintaining pressure in said bellows.

6. Apparatus as set forth in claim 4, wherein said control means functions to provide a liquid cycle, a balancing cycle and an extraction cycle, said apparatus having in its resiliently supported mode a critical resonant frequency which is less than the speed of the extraction cycle and greater than the speed of the balancing cycle, and wherein said control means actuates said resilient means to effect a resilient support for the chamber after the liquid and balancing cycle but before the chamber has reached the critical speed, whereby the chamber is accelerated through the critical speed while resiliently supported.

7. Apparatus as set forth in claim 5 wherein said resilient support means includes four bellows, said bellows being disposed at four rectangularly arranged points about the periphery of the housing said chamber being rotatable about a horizontal axis, a pair of level sensors at one end of said axis on opposite sides thereof for admitting air respectively to the two bellows adjacent that end and a single level sensor at the other end of the axis for admitting air simultaneously to the two bellows adjacent said other end.

8. Apparatus as set forth in claim 7, including a plurality of control valves disposed, respectively, in series with said bellows and responsive to said control means to lift and lower said housing.

References Cited

UNITED STATES PATENTS

| | | | |
|---|---|---|---|
| 2,660,870 | 12/1953 | Kennedy | 68—24 |
| 3,088,593 | 5/1963 | Stilwell | 210—364 X |
| 3,108,465 | 10/1963 | Bochan | 68—24 |

FOREIGN PATENTS

| | | |
|---|---|---|
| 1,319,554 | 1/1963 | France. |
| 1,327,557 | 4/1963 | France. |
| 1,340,842 | 9/1963 | France. |

WILLIAM I. PRICE, *Primary Examiner.*